Oct. 1, 1968  D. E. WESTLING  3,403,712
MACHINE FOR DISPENSING SAUSAGE AND THE LIKE
Filed April 4, 1966  2 Sheets-Sheet 1
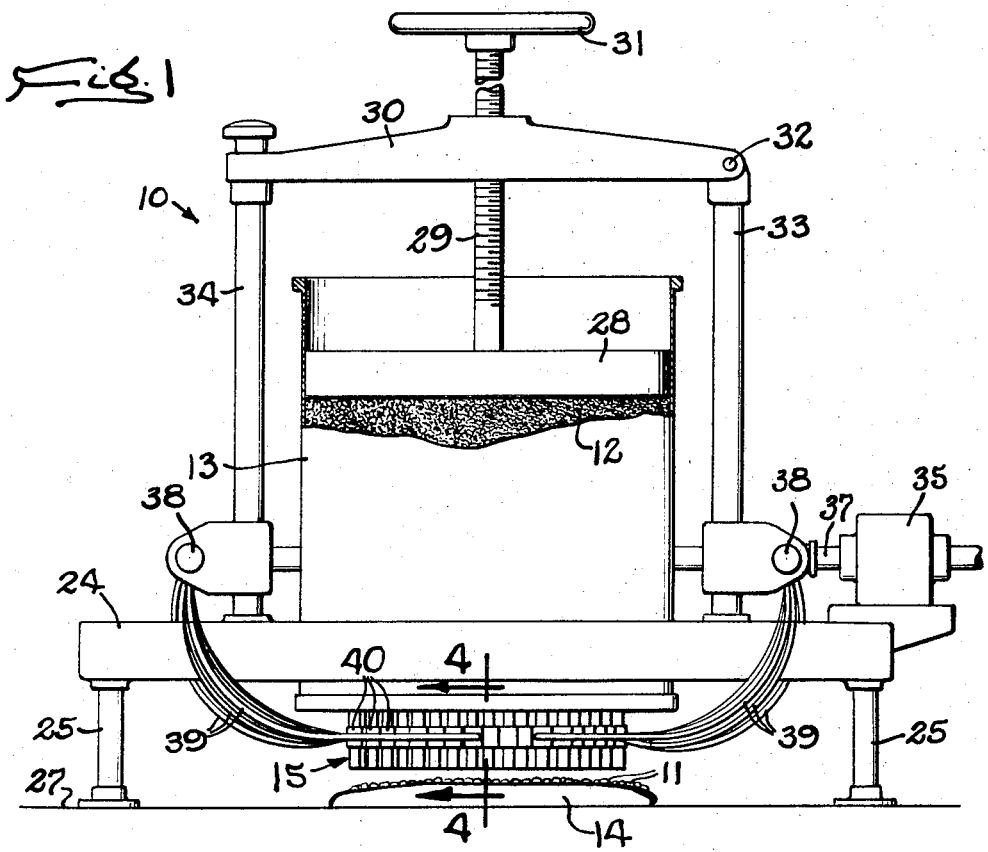
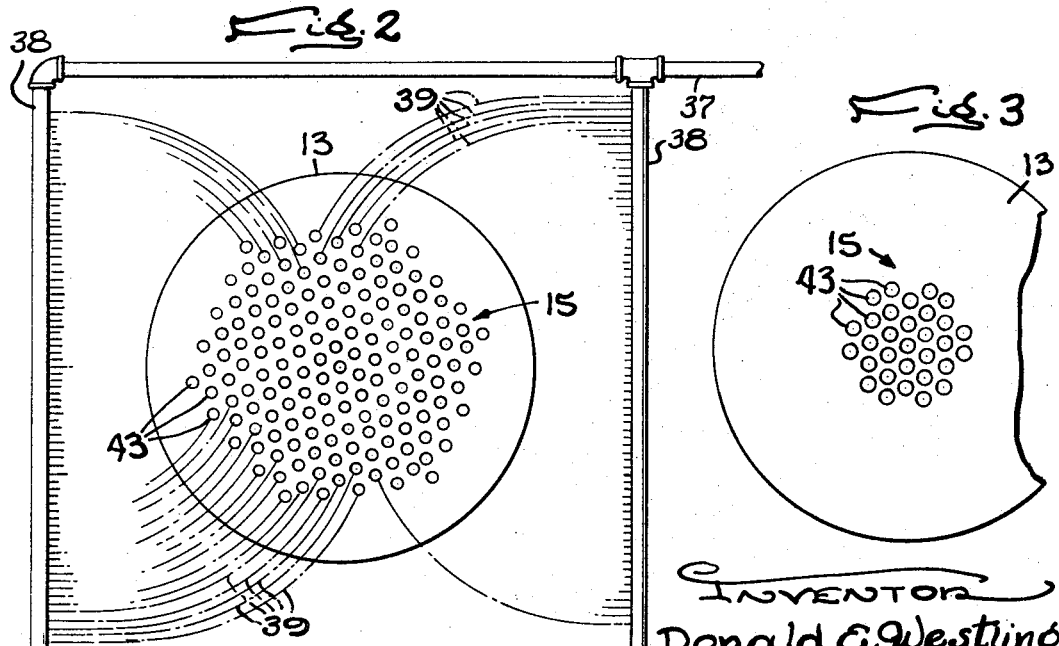
INVENTOR
Donald E. Westling
by Wolfe, Hubbard, Voit & Osann
ATTORNEY

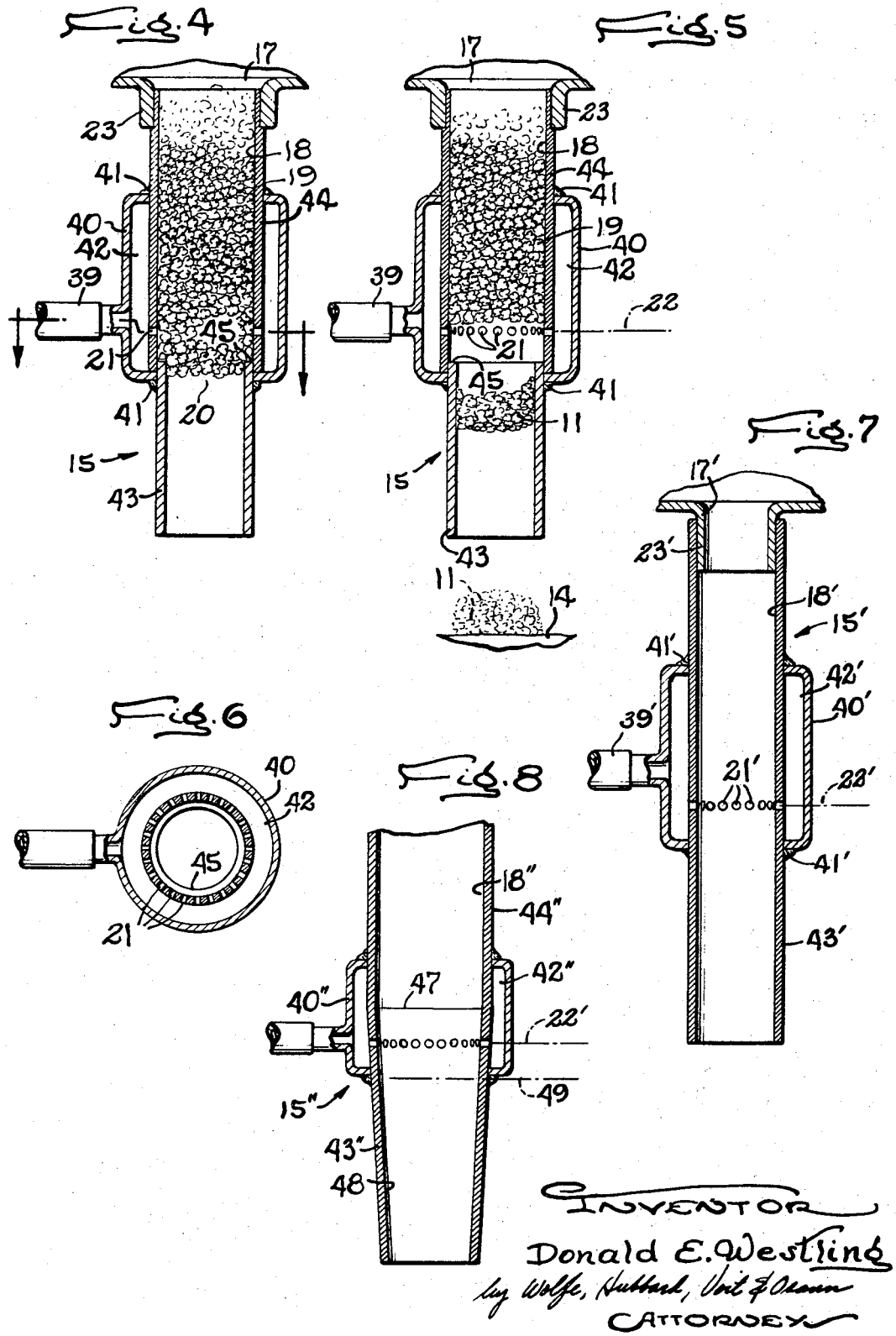

United States Patent Office 3,403,712
Patented Oct. 1, 1968

3,403,712
MACHINE FOR DISPENSING SAUSAGE
AND THE LIKE
Donald E. Westling, 2432 Iva Court,
Beloit, Wis. 53511
Filed Apr. 4, 1966, Ser. No. 539,967
11 Claims. (Cl. 146—129)

ABSTRACT OF THE DISCLOSURE

A machine for dispensing sausage and the like having a tub from which the sausage is pressed by a manually operable plunger through openings in the bottom of the tub into hollow discharge tubes in a preselected arrangement to form columns of sausage. Around each tube is a manifold to which air under pressure is delivered to issue into the tube in a plurality of jets above the lower end of the column therein, thereby to sever the end portion from the column and expel it through the open lower end of the tube toward a pizza beneath the machine. To position the lower end of the column, one form has an internal shoulder forming a restriction, another has a taper gradually restricting the passage, and another has no restriction, simply relying on the feeding apparatus to control the positions of the lower ends of the columns.

---

This invention relates to the dispensing of flowable semi-solid or pasty material and, more particularly, to the dispensing of sausage and the like from a supply mass onto pizzas. In the "raw" form, sausage is very difficult to handle, and the placing of several pieces of sausage on a pizza prior to baking the latter is a time-consuming and messy operation.

The general object of the present invention is to provide a commercialy practical machine for dispensing difficult-to-handle pasty materials quickly and easily in large quantities but in relatively small and uniformly distributed pieces and thereby simplifying the volume production of pizza with sausage.

A more detailed object is to feed pasty material such as sausage from the supply mass into a plurality of discharge passages having outlets arranged over the discharge area, and to sever the terminal portions of the sausage in the passages in an effective and simple manner for discharge onto the area.

Another object is to expel the severed portions from the passage onto pizza automatically as an incident to the severing operation.

A further object is to limit the forced feeding of the sausage along the passages and hold the lower portions releasably in place in a simple manner prior to severance and expulsion.

Still another object is to control the direction of the severed portions and guide the latter into the desired positions on the pizza.

Another object is to provide a single dispensing machine usable for several different sizes of pizzas.

The invention also resides in the novel manner of severing pasty material and expelling the same with fluid jets.

Other objects and advantages of the invention will become apparent from the following detailed description taken in connection with the accompanying drawings, in which FIGURE 1 is a side elevational view of a sausage dispensing machine embodying the novel features of the present invention, shown with a pizza in position to receive sausage.

FIG. 2 is a schematic bottom view showing the arrangement of discharge elements and their air supply connections.

FIG. 3 is a view similar to part of FIG. 4 showing only the discharge elements used for smaller pizzas.

FIG. 4 is an enlarged fragmentary cross-section taken substantially along the line 4—4 of FIG. 1 and showing the condition of the sausage in a discharge element prior to severance.

FIG. 5 is a view similar to FIG. 4 but showing the condition after severance.

FIG. 6 is a fragmentary cross-section taken substantially along the line 6—6 of FIG. 4.

FIGS. 7 and 8 are views similar to FIG. 4 showing alternate forms of the discharge element.

As shown in the drawings for purposes of illustration, the invention is embodied in a machine 10 for dispensing small pieces 11 of sausage from a supply mass 12 in a receptacle 13 onto a pizza 14 in a discharge area beneath the machine, the machine being formed in a novel manner to dispense successive groups of pieces quickly and easily onto successive pizzzas in the discharge area in a preselected pattern. With such a machine, a relatively large number of pieces may be placed on each pizzza in a few seconds in a preselected pattern, not only saving a substantial amount of time per pizzza but also resulting in an improved product as compared to presently used commercial methods.

To the foregoing ends, a plurality of tubular discharge elements 15 are secured to the underside of the cylinder 13 with feed openings 17 (FIGS. 4 and 5) in the receptacle communicating with the interior passages 18 defined by the discharge elements, and sausage from the supply mass 12 is fed downwardly into these passages to form columns 19 having lower ends 20 adjacent the open lower ends of the passages. At least one nozzle 21 is positioned at a cut-off level 22 above the level of the end of the column 19 in each passage, and opens laterally into the passage to direct a charge of fluid under pressure into and across the passage to sever the lower portion of the column beyond the nozzle, from the remainder of the column. At the same time, the pressure fluid expels the severed portion through the open lower end of the discharge element toward the discharge area. With this arrangement, difficult-to-handle sausage is divided quickly and easily into small pieces of controlled size and automatically delivered to and positioned on the pizza, thus eliminating the tedious, messy and time-consuming manual operation that has been used in the past.

In this instance, the receptacle 13 is simply a cylindrical tub having an open upper end and a preselected number of holes 17 in its bottom provided with fittings 23 for receiving the upper ends of the tubular discharge elements 15 with a press fit. Of course, there are many different ways that this connection can be made. In FIG. 7, for example, the tubular element 15' is telescoped tightly over the fitting 23' on the bottom of the tub, and a threaded connection also may be used. The tub is supported on a horizontal framework 24 having legs 25 for engaging a work surface 27 such as a table or counter top.

To feed sausage 12 from the tub 13 through the openings 17 and into the discharge passages 18, a plunger 28 is fitted in the tub and selectively movable up and down therein by means of a screw 29 threaded through a horizontal crossbar 30 spaced above the top of the tub. The lower end of the screw is rotatably connected to the plunger, and a hand wheel 31 is fastened to the upper end of the screw to facilitate turning of the latter to force sausage from the tub into the discharge passages. The crossbar is pivoted at one end on a horizontal pin 32 adjacent the top of a post 33 upstanding from the framework 24 on the right side of the tub, and is releasably secured at its other end on top of a similar post 34 on the opposite side of the tub. Accordingly, when the plunger is at the top of the tub, it may be swung upwardly and to one side, about the axis defined by the pin 32, for easy refilling of the tub.

Each of the novel discharge elements 15 comprises a hollow tube preferably composed of metal, and the nozzles 21, of which there should be several, are holes punched through the tube in a circular series above the lower end of the tube. The level of these nozzles determines the cut-off level 22 of the discharge element. The preferred cut-off fluid is pressurized air from a suitable source (not shown) such as a pump, delivered to the nozzles of each element through a valve 35, pipes 37 and 38 (FIGS. 1 and 2), flexible hoses 39 leading to the elements, and manifolds 40 each in the form of a sleeve larger than and encircling the discharge tube at the level of the nozzles 21 and sealed as by welding to the tube at 41 above and below the nozzles. In this manner, the manifold sleeves define annular air chambers 42 around the tubes communicating between the supply hoses 39 and the nozzles 21.

In the preferred form of the discharge element shown in FIGS. 4–6, a second tube 43 smaller than the upper discharge tube 44 is telescoped snugly into the lower end portion of the upper tube and fastened in place with its upper end 45 below the nozzles 21 and constituting an annular shoulder in the discharge passage forming a restriction therein below the cut-off level 22. As illustrated in FIG. 4, this restriction serves as means for resisting feeding of the column 19 of sausage down the passage 18 and will hold the column in place in the absence of substantial feeding pressure from above. It will be seen in FIG. 4 that the spacing of the shoulder 45 below the cut-off level 22 determines the approximate spacing of the lower end 20 of the sausage column below the cut-off level, and thus sets the approximate thickness of the pieces 11 of sausage that are dispensed. I prefer a spacing on the order of ¼ inch, and an upper discharge tube with an inside diameter of about ½ inch.

Shown in FIGS. 7 and 8 are two alternate forms 15′ and 15″ of the discharge element made without the shoulder 45, similar parts in these forms being indicated with corresponding primed and double-primed reference numbers. In FIG. 8, the lower end portion 43″ is tapered downwardly from a level 47 spaced above the cut-off level 22″ to form a progressively narrowing restriction 48 for holding the end of the column of sausage simply by compressing it as it passes the cut-off level. I have found that the taper shown in FIG. 8 will stop the column at a preselected approximate level 49 somewhat below the cut-off level. In the form 15′ in FIG. 7, there is no restriction in the discharge passage 18′. This form simply relies on the closing of the upper end of the passage by sausage in the tube to hold the column in place, using the feed pressure alone to control the feeding of sausage down the passage.

To begin operation of the machine, a supply 12 of sausage is placed in the tub 13 and the plunger 28 is lowered to press the sausage into the discharge passages 18. When the lower end of the sausage columns 19 reach the level shown in FIG. 4, the machine is ready for operation. With a pizza 14 positioned in the discharge area beneath the machine, a momentary blast of air of suitable relatively low pressure such as 4–6 p.s.i. is admitted through the valve 35 into the pipe 37 and produces a pulse of pressure through the pipes 38 and the hoses 39 to the pressure chamber 42 in each manifold 40. From the pressure chamber, the air issues into and across the associated discharge passage 18 in a plurality of jets which slice through the sausage column at the cut-off level 22 and separate the terminal portion 11 of each column from the remainder thereof, as shown in FIG. 5. The blast is maintained long enough to effect the severance and to blow the severed portion downwardly and out of the discharge passage onto the pizza below.

In each of the three forms, the tube 43 forming the lower end portion of the element extends a substantial distance, for example, about 2 inches, beyond the end 20 of the sausage column in order to guide the severed piece as it is expelled. Without this so-called "barrel" beyond the piece as it is severed, the direction of discharge would be erratic and uncontrolled.

A smaller discharge pattern with fewer nozzles is illustrated in FIG. 3. As is well known, pizza typically is sold in three diameters—10 inch, 14 inch and 16 inch. The pattern shown in FIG. 2 with approximately 150 elements is intended for use on 16-inch diameter pizzas. Of course, fewer elements may be provided, if desired, and smaller machines may be designed for smaller pizzas. To adapt the larger machine for different sizes of pizzas, all that is necessary is the provision of an air control (not shown) which supplies air selectively to a central group of elements within a 10-inch circle, to a larger group within a 14-inch circle, or to the full group within a 16-inch circle. With three control valves and a somewhat more complex piping arrangement, one machine will handle all three different sizes.

While the invention has been described in connection with the illustrative embodiments shown in the drawings, it will be understood that it is not limited thereto, and that my intention is to cover all modifications and alternative constructions falling within the spirit and scope of the invention as expressed in the claims.

I claim as my invention:

1. In a machine for dispensing sausage and the like, the combination of, a plurality of tubular discharge elements each having an open discharge end, said elements being arranged in side-by-side relation to dispense portions of sausage in a preselected pattern, means for feeding sausage into the discharge passage defined by the interior of each of said elements and forming a column of material therein terminating adjacent said open end, at least one nozzle spaced from the said open end of each element and opening laterally into said discharge passage, and means for directing a charge of fluid under pressure through each nozzle across said passage at a preselected cut-off level to sever the portion of said column beyond the nozzle from the column and expel the severed portion through said open end.

2. A dispensing machine as defined in claim 1 in which each of said elements has a plurality of nozzles opening through the element at a common cut-off level to direct simultaneous jets of fluid into said interior from several sides thereof.

3. A dispensing machine as defined in claim 2 in which said charge-admitting means includes a manifold encircling each of said element at said cut-off level and defining an annular pressure chamber communicating with said nozzles.

4. A dispensing machine as defined in claim 2 in which said feeding means comprises a receptacle for holding a mass of the sausage and having feed openings communicating with said passages, and selectively operable means for forcing sausage from said mass into and along said passages.

5. A dispensing machine as defined in claim 1 in which each of said discharge elements has means beyond said cut-off level for resisting movement of said column and holding the lower end of the column a preselected approximate distance beyond said level.

6. A dispensing machine as defined in claim 2 in which said resisting means is an internal shoulder encircling said passage and forming a restriction therein beyond said level.

7. An dispensing machine as defined in claim 5 in which said resisting means is a taper in the end portion of each element gradually restricting said passage toward said open end to hold the column therein with its end below said level.

8. A dispensing machine as defined in claim 5 further including a tubular barrel of substantial length extending beyond said resisting means to guide the severed portions during discharge.

9. A machine for dispensing sausage and the like onto a pizza from a mass supply, said machine having, in combination, a receptacle for holding the mass supply of sausage and having a plurality of outlet openings in one wall thereof for passage of the sausage through said wall in a plurality of columns, a plurality of discharge tubes each communicating with one of said openings to receive sausage therefrom, said tubes having downwardly opening lower ends, at least one hole opening into the tube at a predetermined cut-off level above the lower end of the tube, means restricting movement of the columns in each of said tubes and holding lower ends of said columns substantially stationary a preselected approximate distance beyond said level thereby to position each column with its lower end beyond said level, and means for directing charges of fluid under pressure simultaneously into all of said tubes through the holes therein to sever the portions of said columns beyond said level and expel the severed portions through said lower ends for deposit on a pizza.

10. A sausage dispensing machine as defined in claim 9 in which each of said tubes has a plurality of holes spaced around the tube at said cut-off level and opening from opposie sides of the tube toward the center of the latter, and said last-mentioned means includes a manifold disposed around each tube to receive a charge of fluid under pressure and direct the charge into the tube through said holes.

11. A sausage dispensing machine as defined in claim 9 in which said restricting means narrow the effective size of said tubes to hold the columns in the desired positions.

References Cited
UNITED STATES PATENTS

| | | | |
|---|---|---|---|
| 814,774 | 3/1906 | Dixon et al. | 83—177 |
| 1,747,087 | 2/1930 | Schmalz | 83—177 |
| 1,799,755 | 4/1931 | Loughridge | 222—193 X |

JAMES M. MEISTER, *Primary Examiner.*